United States Patent
Block et al.

(10) Patent No.: US 10,719,788 B2
(45) Date of Patent: Jul. 21, 2020

(54) GOAL MANAGEMENT METHOD AND SYSTEM

(76) Inventors: Torin J. Block, Oakland, CA (US);
Gladys M. Block, Berkeley, CA (US);
Clifford H. Block, Berkeley, CA (US)

( * ) Notice: Subject to any disclaimer, the term of this patent is extended or adjusted under 35 U.S.C. 154(b) by 0 days.

(21) Appl. No.: 13/252,993

(22) Filed: Oct. 4, 2011

(65) Prior Publication Data
US 2012/0089909 A1    Apr. 12, 2012

Related U.S. Application Data (60) Provisional application No. 61/344,783, filed on Oct. 4, 2010.

(51) Int. Cl.
*G06Q 10/06* (2012.01)

(52) U.S. Cl.
CPC .................. *G06Q 10/06* (2013.01)

(58) Field of Classification Search
CPC .. G06Q 10/06; G06F 19/3475; G06F 19/3481
USPC .............................................. 482/9; 434/127
See application file for complete search history.

(56) References Cited

U.S. PATENT DOCUMENTS

| | | | |
|---|---|---|---|
| 5,673,691 A | 10/1997 | Abrams et al. | |
| 6,269,339 B1 | 7/2001 | Silver | |
| 6,585,516 B1 * | 7/2003 | Alabaster | G09B 19/0092 128/921 |
| 7,090,638 B2 * | 8/2006 | Vidgen | 600/300 |
| 7,662,065 B1 * | 2/2010 | Kahn et al. | 482/9 |
| 7,689,437 B1 | 3/2010 | Teller et al. | |
| 7,967,731 B2 | 6/2011 | Kil | |
| 2005/0113649 A1 * | 5/2005 | Bergantino | 600/300 |
| 2005/0228691 A1 * | 10/2005 | Paparo | 705/2 |
| 2006/0058586 A1 * | 3/2006 | Humble | 600/300 |
| 2008/0012701 A1 * | 1/2008 | Kass | A61B 5/0002 340/539.11 |
| 2008/0076637 A1 * | 3/2008 | Gilley | G06F 19/3406 482/9 |
| 2008/0199835 A1 * | 8/2008 | Yeager | 434/127 |

(Continued)

OTHER PUBLICATIONS

"Weight-loss and Nutrition Myths," Jun. 9, 2010, Weight-control Information Network, available at <http://web.archive.org/web/20100609010040/http://win.niddk.nih.gov/publications/myths.htm>.*

(Continued)

*Primary Examiner* — Andrew T Chiusano
(74) *Attorney, Agent, or Firm* — Innovation Counsel LLP

(57) ABSTRACT

A computer-implemented method of generating a set of goals is presented. The method entails receiving user input that includes items and an input value associated with each of the items. Individual values are assigned to the items based on the input value. The individual values are then summed to generate a total value, and the items are ranked according to the contributions of their respective individual values to the total value. A difference between the total value and a corresponding reference value is determined. The input value that is associated with the highest-ranking item is changed, and the total value and the difference are then recalculated using the changed input value. The process is repeated with the next highest-ranked item and the next until a condition is fulfilled. A goal is defined based on the changed input value of the items at the time the condition is fulfilled.

16 Claims, 7 Drawing Sheets

(56) References Cited

U.S. PATENT DOCUMENTS

| | | |
|---|---|---|
| 2010/0042438 A1 | 2/2010 | Moore et al. |
| 2010/0136508 A1* | 6/2010 | Zekhtser ............ G09B 19/0092 434/127 |
| 2011/0009708 A1* | 1/2011 | Boyes .......................... 600/300 |
| 2014/0114680 A1* | 4/2014 | Mills .................. G06F 19/3431 705/2 |

OTHER PUBLICATIONS

International Search Report and Written Opinion corresponding to PCT/US11/54821, dated Feb. 12, 2012, 9 pages.

* cited by examiner

◎ My Goals for this Week
Your weekly plan

Your optimized action plan for fats and sugars:

82
- ☐ I will have only 1 serving of ice cream this week.
- ☐ I will have diet soda instead of regular.
- ☐ I will have an apple instead of chips with my sandwich.
- ☐ I will eat fish 3 days a week.
- ☐ Change my action plan.

Other goals you might like:

84
- ☐ This week I will replace a satfat food with an alternative, on [2▼] days this week
- ☐ Another really easy thing to do is to use a substitute in your coffee or tea or on your cereal. This week I will use a sugar substitute instead of sugar or honey in coffee or tea
- ☐ This week I will eat smaller amounts of food with saturated fat, on [2▼] days this week.
- ☐ I will ask for all [butter ▼] on the side when I order at a restaurant this week.
- ☐ Two days this week, I will eat a smaller portion of [______] than I usually do. (Write something in.)
- ☐ Write your own goal:
  [__________________] ~88

TRY ME: Check out the "What If....?" simulator tool to see the effect of accomplishing these goals.

💡 Small Steps are the Key

Eating well is critical for good health.

You don't have to change your way of life - or give up things you like.

Take small steps, and move toward your goal of eating more fruits and vegetables.

Improving your food habits can be EASY, if you take it in small steps.

Check this week's Health Notes on your personal web page for more information about nutrition and health.

⚠ If you have made any selections, please click the submit button

[ Submit ] ~89

*If your email program does not support HTML. Please click the link at the top of this page to Submit your goals for this week.*

💡 Remember why you want to eat better and be active: You want to set a good example for your family.

Log Your Diet and Activity
The US Department of Agriculture offers a free online program to help you keep track of your usual diet and physical activity behaviors.
Visit the USDA's Pyramid Tracker on the web.

Visit Your Web Site
You can visit your personalized web site to ...
- review your goals
- read this week's health notes
- review your progress so far
- play with trade-offs sliders to see the effects of changing
- your lifestyle
  get help overcoming barriers
- participate in the discussion board

WE HAVEN'T HEARD FROM YOU . . .

*Remember why you wanted to be more active, Alexander? One reason you told us is to be healthier and prevent disease. Making changes can be challenging, so don't get discouraged if you aren't successful right away. Get back on track by setting some small goals that fit into your lifestyle. See page 2 for help making a plan.*

WHAT GETS IN THE WAY OF ACTIVITY?

If you find that you don't enjoy or are not interested in exercise, it can be very difficult to be motivated to include it in you normal routine. It is helpful to remind yourself of the benefits of exercise. Also, it is important to remember that all activity is beneficial for your body.

GOAL MANAGEMENT METHOD AND SYSTEM

RELATED APPLICATION

This application claims priority to U.S. Provisional Patent Application No. 61/344,783 filed on Oct. 4, 2010, the content of which is incorporated by reference herein.

FIELD OF INVENTION

The present invention relates generally to a system and method for generating and pursing a goal.

BACKGROUND

It is well known that a person's diet and physical activities greatly affect her emotional well being, intellectual clarity, and physical health. While almost everyone desires to achieve a state of well being that comes from a healthy, balanced lifestyle, achieving that goal is often a struggle. Job demands, family demands, and financial constraints are only some of the barriers that one has to overcome to maintain a healthful diet and activity level. Especially with obesity and Type-2 Diabetes becoming increasing health concerns in some developed countries, efforts to reach and maintain a healthy lifestyle and weight through better eating habits and regularly engaging in physical activity have become more of a public health focus.

Chronic conditions are highly correlated with obesity, low physical activity and other lifestyle factors. Increasing costs of health care and loss in workforce productivity have employers, health care providers and individuals looking for better preventative care measures. A need exists for a method and system to address behaviors such as dietary intake, physical activity levels, and other areas.

A system that can help a person set realistic goals to achieve and maintain a healthy lifestyle is desired.

SUMMARY OF THE INVENTION

In one aspect, the invention is a computer-implemented method of generating a set of goals. The method entails receiving user input from a user, the user input including items and an input value associated with each of the items. Individual values are assigned to the items based on the input value. The individual values are then summed to generate a total value. The items are ranked according to the contributions of their respective individual values to the total value. A difference is determined between the total value and a corresponding reference value. The highest-ranked item is identified, the input value that is associated with the highest-ranking item is changed, and the total value and the difference are then recalculated using the changed input value. If a condition is not fulfilled, the item that is next-highest-ranked is identified, its input value is changed, and the total value and the difference are recalculated using the changed input value. A goal is defined based on the changed input value of the items at the time the condition is fulfilled. The condition may be fulfilled, for example, if the difference between the total value and the reference value is less than or equal to a predetermined amount.

In another aspect, the invention is a computer-implemented method of generating a set of goals for a user. The method entails receiving user input including a plurality of items, assigning an individual value of each item of the user input, generating a base goal and a set of options related to the base goal, wherein the set of options is generated based on the individual value, and receiving a user selection from the set of options to generate a customized goal. For example, the user selection may be received in the form of a drop-down menu choice.

BRIEF DESCRIPTION OF THE DRAWINGS

FIG. 5 depicts an example embodiment of the Personalized Goal setting page in accordance with the invention.

DETAILED DESCRIPTION

Wellness tools that allow individuals to consider their risk factors have been offered. These wellness tools, however, did not address incremental step behavior change through goal-setting. The system of the invention has advantages in one or more aspects by offering interactive and individually-tailored or personalized Action Plans. "Action Plans," as used herein, are a set of goals that are tailored to an individual user to fit her lifestyle. The invention offers a system that includes interactive email, tailored phone and print messaging, text messaging and smartphone applications to make Action Plans and any support to achieve the Action Plans easily accessible. In addition, aspects of the system may provide a low cost behavior modification tool for people to change their health and/or other desired outcomes at their own pace. The system may modify an individual's behaviors and habits by providing the user one or more flexible and personalized plans with a modifiable goal-setting program delivered on a frequent basis.

The invention is an interactive tool that helps a user identify her goal(s) in one or more areas, personalize the goal(s) into realistically achievable steps, and achieve the goal(s). Although the invention will be described in the context of a health-related application, the invention may be adapted to various other applications where multiple variables determine an outcome and a course of action is to be planned. The Action Plan tool that is described herein, for example, provides a user instant feedback on how her behaviors and actions affect the overall outcome, allowing her to modify her actions in a way that maximizes the benefit while providing motivational support.

A "base" Action Plan, as used herein, indicates a tailored goal plan that is generated by the system based on analysis of a user's answers to questions, as opposed to a user-generated Action Plan that indicates a tailored goal plan generated by the user. A "personalized" Action Plan, as used herein, is a user-modified version of the base Action Plan. The personalized Action Plan can be further customized by the user when setting periodic (e.g., weekly) goals. "User input" includes user's answers to questions. A "set" is intended to mean one or more; for example, a "set of goals" is intended to mean one or more goals. "Incrementing" may be done by a positive or negative amount.

Figure 1:
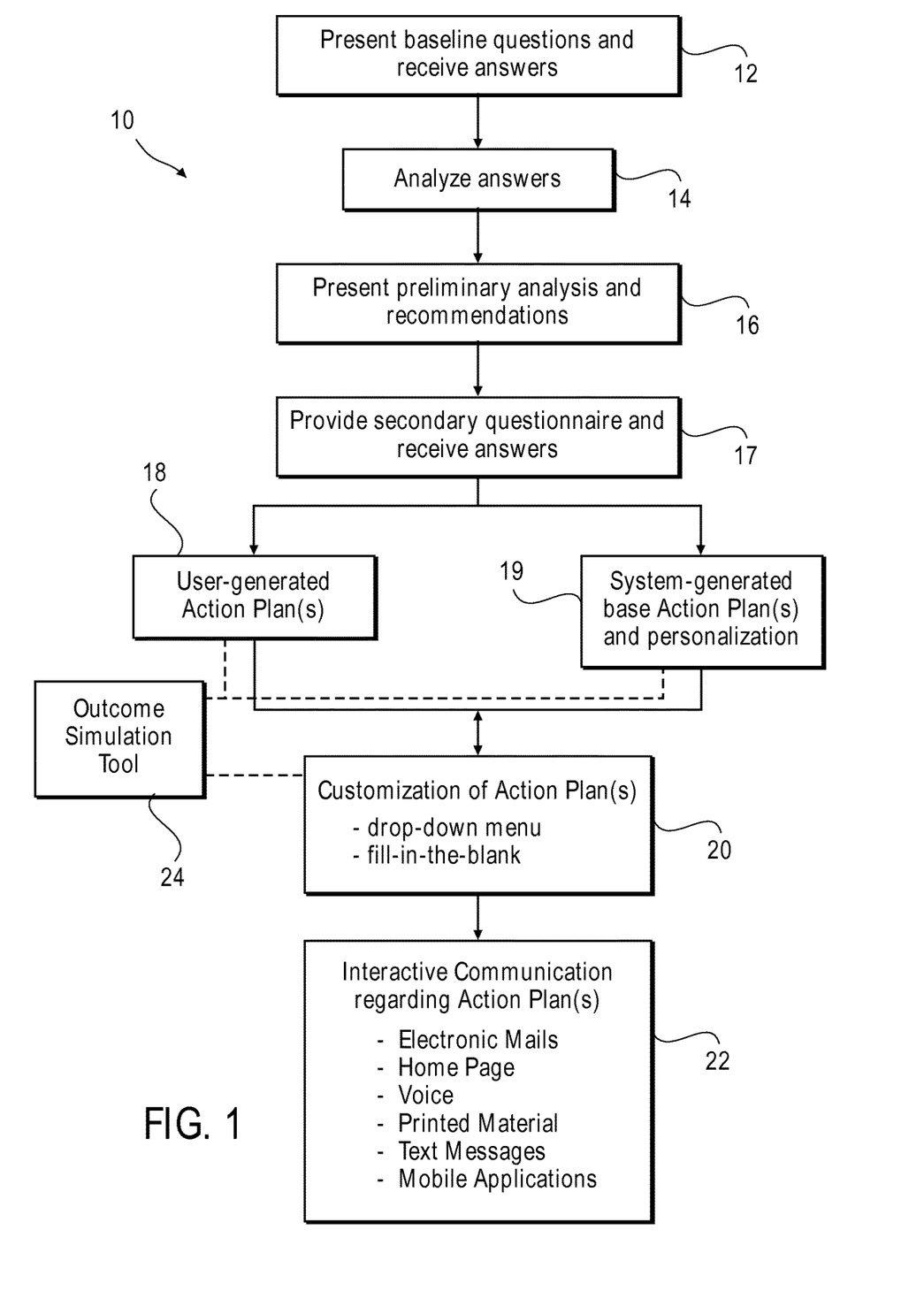
FIG. 1 depicts an overview of a goal management process in accordance with an embodiment of the invention.

FIG. 1 depicts an overview of a goal management process 10 in accordance with an embodiment of the invention. In the example embodiment of FIG. 1, the goal management process 10 includes presentation of a set of baseline questions (step 12). The baseline questions presented may relate to certain aspects of one's lifestyle, such as current eating habits, current physical activity habits, or current spending habits. Eating habits may include the frequency, quantity, and type of consumption (e.g., lowfat vs. whole milk). Physical activity habits would include frequency, duration, type, and intensity of the activity. For example, a question could be about the user's behavior or action, such as "How often do you engage in moderate physical activity, such as walking at a moderate pace"?" The questions asked at this stage may also include whether the user is willing to do different types of physical activities, whether the user has any disabilities that limit her activities, etc. and may also ask the user to identify factors that are thought to be important to the outcome or factors that factor into the user's planning.

User response to the baseline questions are received and analyzed (step 14). Upon receiving answers to all the baseline questions, the user's levels are calculated for each of a predefined set of Topics. In one embodiment, the Topics include Caloric intake, Physical Activity, Fruits and Vegetable consumption, Saturated Fat consumption, Sugar consumption, and Trans Fat consumption and are compared to the recommended levels that are stored in a database for different user-types (user type may depend on age/sex/pregnancy status/weight/BMI, among others). Based on the comparison, preliminary analysis results are presented (step 16). The preliminary analysis result may include changes that the user would need to make to get closer to the recommended levels. For example, if the user's answer reflects that she eats two servings of fruits and vegetables per day but the recommended level is to consume eight servings every day, the recommendation would state that she needs to increase her total daily fruit and vegetable consumption by a certain amount.

In presenting the preliminary analysis results, the user is provided a suggestion based on a determination of what would be the most beneficial to the user—i.e., the user's base Action Plan. The suggestion is based on the user's distance from a recommended level for each Topic. For example, if the user's dietary intake is farthest from the Fruits and Vegetables recommended intake, a lifestyle change in that Topic area would be suggested. However, as will be explained below, the user has the option of making a change that is other than what is suggested. The dietary intake guidelines from national and/or international governments or organizational guidelines may be used to determine the recommended dietary intake levels.

In the particular implementation of the goal management process 10 depicted in FIG. 1, the system asks the user if she would like to proceed with Action Plan generation when the recommendations are presented in step 16. Upon receiving a positive response from the user, an Action Plan generation module presents the user with a set of secondary questions (step 17). The secondary questions include tailoring questions that help gain an insight into the user's lifestyle, habits, and motivations. Some of the tailoring questions include whether the user cooks and if so, how often, or what the user's last-measured blood pressure level is.

There are two types of Action Plans: a user-generated Action Plan (step 18) and the system-generated base Action Plan (step 19). The user herself creates a user-generated Action Plan (step 18). A user-generated Action plan begins with the "You Were Here" and "You Could Be Here" and "Your Goal" pointers of the Outcome Simulation Tool all pointing to the original user inputs and to the original calculated Totals (more description of the pointers and the Outcome Simulation Tool will be provided below). In other words, no suggested changes to the User's input have been made by the system; it's up to the user to define all of the changes that she wants to make in order to move the "Your Goal" and You Could Be Here" pointers.

Figure 2:
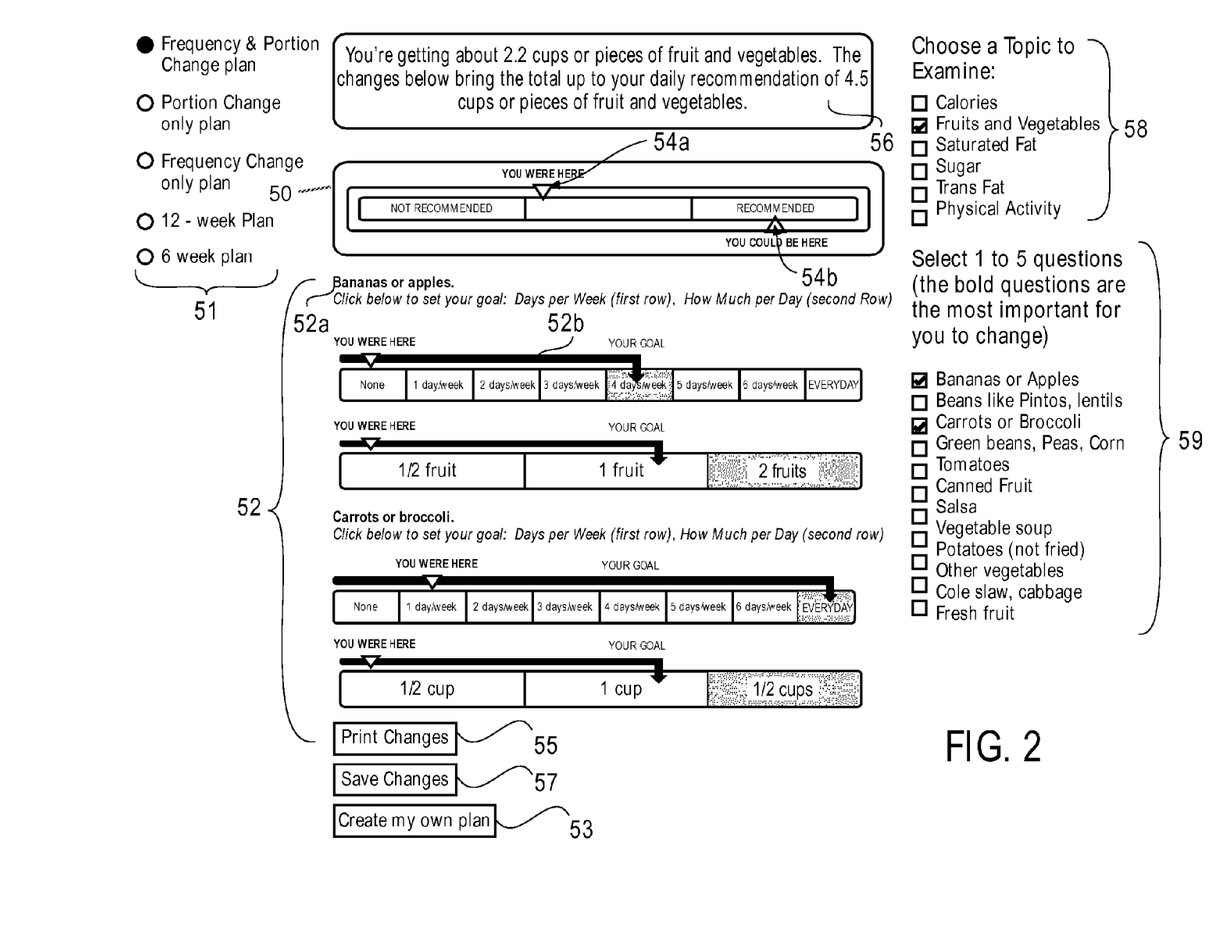
FIG. 2 depicts an embodiment of the base Action Plan generation page that would be presented to the user during the goal management process.

Based on the user's answers to the questions, base Action Plans are generated by the system (step 19). FIG. 2 depicts the base Action Plans page that is generated for the user, more details of which are provided below. The system-generated base Action Plan identifies specific changes the user would have to make, listing all of the system generated changes to sub-topics that would be required to move the user from her current status to the recommended levels of physical activity and dietary intake. The Action Plan factors in the user's answers to both the baseline questions and the secondary questions, and is thus highly tailored to the user and her lifestyle. For example, if the user does not cook, cooking-related goals would not be included in the base Action Plan and if the user is a vegetarian, recommendations for cutting down red meat consumption would not be included. As will be described in more detail below, the Action Plan page allows the user to personalize the Action Plan by using the Outcome Simulation Tool 24 to test out different changes and receive immediate feedback on the effect of those changes. After testing out different goals with the Outcome Simulation Tool 24, the user may settle on an Action Plan and print and/or save it.

The highly-tailored and personalized base Action Plan may be further customized (step 20). Customized goals may be set periodically, for example weekly. The user is given the option to personalize and customize the base Action Plan in a number of ways, such as on a Web page or via an interactive email or via a smartphone. The user may choose to select other base Action Plans including different goal types such as frequency-only goals or portion-only goals, and the user can personalize and customize any base Action Plan. At the end of step 20, the user has her personalized Action Plan for the duration of the program.

The Outcome Simulation Tool 24 is accessible at different stages in the goal generation process 10, such as in setting the base Action Plan(s) (steps 18 and 19) and personalizing the Action Plan (step 20). More details on the Outcome Simulation Tool 24 will be provided below.

Then, the system provides individualized support to help the user achieve the goals and the desired outcome (step 22). This support may be provided via interactive email messages, the user's Home Page, voice messages, printed material, text messaging and via a smartphone application.

Various modifications may be made to the particular embodiment of the goal management process 10 that is depicted in FIG. 1. For example, the user may be asked to sign up and open an account in step 12, step 16, or any other suitable point in the process. Also, in some embodiments, baseline questionnaire inputs 12 and secondary questionnaire inputs 17 may occur at the same step. Although the analysis in step 14 is depicted as being performed after answers to all the questions in the baseline questionnaire have been answered, this is not a limitation of the invention and analysis may be performed in a more dynamic manner, for example after receipt of each response. This alternative implementation presents the user with feedback (e.g., a calorie count) as she proceeds through the questionnaire, providing immediate feedback and more interest, thereby making it more likely that the questions will be answered completely and accurately.

FIG. 2 depicts an embodiment of the Action Plan generation page that would be presented to the user in step 19 of the goal management process 10. Action Plan goals may be categorized into different types 51, for example into "portion-size change only", "frequency only," and "portion-size and frequency change" or "slow change: 12-week Action Plan" and "aggressive change: 6-week Action Plan." By choosing the different system generated action plans 51, a user can switch back and forth between different types of base Action Plans. Upon choosing one of the presented Action Plans (e.g., Frequency and Portion Change plan), the user can save it or further personalize the chosen type of Action Plan and save it.

As shown, the Action Plan has multiple Topics 58 and each of the Topics 58 has sub-topics 59. In the embodiment shown, the Topics are Calories, Fruits and Vegetables, Saturated Fat, Sugar, and Trans Fat. The user is allowed to switch between Topics by checking the appropriate box. For the Topic of Fruits and Vegetables, there are a series of sub-topics 59 that are assigned, as shown. The system identifies which sub-topics are more important for the particular user based on previous analyses performed using the user's answers to baseline questions and tailoring questions, for example by showing the most important sub-topics in bold font, thus encouraging the user to make changes in those sub-topics. The system allows the user to choose the sub-topics she is interested in discussing and, upon receiving the user's choices, presents the set of questions and answer choices that are pre-associated with the chosen sub-topics.

The user may work with multiple Topics simultaneously. For example, the system can simultaneously display thermometers for both Fruits and Vegetables and Calories. Similarly, both diet and activity sub-topics can be presented on the same screen, allowing the user to work in both areas to evaluate tradeoffs that could result in net energy deficit, gain, or balance.

The Action Plan includes buttons for printing 55, saving 57, and creating a user-generated Action plan 53. Selecting the User Generated Action plan button 53 would allow the user to create an Action Plan (step 18) that does not include any of the system generated recommended changes. In response to a user command, each of the several base Action Plans may be displayed. Also, as indicated by the bi-directional arrows between steps 18/19 and 20 of the goal management process 10 (see FIG. 1), a user may be allowed to select one base Action Plan (e.g., Frequency & Portion Change plan), then change her mind and go back to a different type of base plan (e.g., Portion Change Only plan).

The particular example that is depicted in FIG. 2 shows the Fruits and Vegetables page, as indicated by the selection of Topics 58 and the heading at the top of the page. What is shown is a Frequency & Portion Change plan, as indicated by the plan type 51. The Fruits and Vegetables page includes a thermometer 50, questions and possible answers 52, and a narrative 56. The thermometer 50 is a visual continuous spectrum with one end representing a state that is far from the recommended level and the other end representing the recommended level of whatever the Topic is (Fruits and Vegetables intake in this particular case). The area between the two ends represents intermediate levels between the worst case and complete compliance with the recommended levels. The thermometer spectrum may indicate other types of ranges in various embodiments.

In personalizing a base action plan or creating a user generated action plan the user would move an arrow 52b to select an alternative response to their previously recorded response. For example, the user may choose to eat bananas or apples×days/week by selecting one of the different answer choices shown in FIG. 2 that relates to Frequency. Similarly, the user may select one of the three answer choices for Portion size. When the user selects an answer choice, the system instantaneously processes the answer and moves a "You Could Be Here" pointer 54b on the thermometer 50 to a position that reflects the updated outcome. In the particular embodiment shown in FIG. 2, the questions are grouped by items 52a. One item, for example, is "Bananas or apples." "Carrots or broccoli" is another item. For each item 52a, there are multiple questions that elicit user input regarding frequency, portion, etc. Based on the user's input, a "You Were Here" pointer 54a is placed at a point on the thermometer 50 that reflects the user's state of compliance with the recommended level.

The position of the pointer 54a is determined based on the user's responses to the baseline questions, and is fixed. The questions presented in the Action Plan page of FIG. 2 elicit some of the same information as the baseline questionnaire. Hence, comparison can be made between the "You Were Here" pointer 54a, which reflects a user's answer to the baseline questions, and the "You Could Be Here" pointer 54b, which reflects a hypothetical or updated response. There may be a separate thermometer 50 for each Topic 58, and more than one thermometer and Topic may be shown on the page. Some topics may not have a thermometer on its page.

As mentioned above, the user can access the Outcome Simulation Tool 24 in modifying her base Action Plan. The Outcome Simulation Tool 24 is presented to the user in the form of a second pointer 54b on the thermometer 50, which is herein referred to as the "You Could Be Here" pointer 54b. After the user is done answering the baseline and tailoring questions, thereby fixing the position of the "You Were Here" pointer 54a, she can use the "You Could Be Here" pointer 54b to learn the effect of a specific action(s) on an outcome. Using the Outcome Simulation Tool 24, the user can see the relevant questions asked in the baseline questionnaire and can change her answers as part of a simulation exercise, and to personalize the system generated plans. In response to an adjustment to one of the answers, the Outcome Simulation Tool 24 immediately (in real-time) processes the answer and moves the pointer 54b to a place on the thermometer 50 that reflects the new estimated total daily value for the Topic of interest.

Question 52, for example, asks for the number of days per week that a banana or apple is eaten as well as how many bananas or apples are eaten per day. If a user currently consumes bananas or apples about one day a week but wants to see what the effect would be if she increased her bananas/apples consumption to 5-6 days a week, she would just select the hypothetical answer and see how it moves the pointer 54b on the thermometer 50. The Outcome Simulation Tool 24 provides instant visual feedback to the user about the effect of her actions on the outcome. Every time the user changes her answer, calculations will be triggered on a real-time, dynamic basis and the pointer is moved on the thermometer to reflect the new answer(s). An "outcome" could include numerous factors, such as potential changes in energy intake, energy balance (combination of diet and activity questions), changes in body weight, changes in risk of disease, or changes in the amount of money spent. An "action" could include numerous behaviors such as choice of food type or amount or frequency, body weight, type or frequency of physical activity, or number of cigarettes smoked. Actions can vary both categorically and by quantity, frequency, and other dimensions affecting the outcome.

The instant feedback function of the Outcome Simulation Tool 24 helps the user personalize a base Action Plan. As the user modifies her answers to the questions 52, she can see the effect of single changes, such as reducing hamburger consumption from 5 days a week to 2 days a week. In addition to seeing the effect of single changes, the user can observe the cumulative effect of a series of changes by modifying her answers to several different questions. The position of the pointer 54*b* gets calculated with each change of answer. This way, the Action Plan could be modified to reach a target desired by the user. For example, by making x changes to y different foods and z different activities the user could affect a net energy (calorie) deficit of 500 calories a day, which is enough to result in loss of one pound of body weight in a week.

Due to the fact that the "You Could Be Here" pointer 54*b* is moved with each hypothetical answer, the user can easily understand the effect of each action on the overall outcome. If, for example, she wants to see how eating one fewer hamburger per week would affect her Saturated Fat outcome, she would change her answer to a hypothetical response that is one fewer than her real response to the hamburger question and observe how the pointer 54*b* moves. With this understanding, she can personalize her base Action Plan to allow her to achieve her goal in a way that is realistically feasible, and allows her to determine how to achieve maximum benefit with the amount and type of effort she wants to expend. For example, suppose that exercising an additional 15 minutes per day and eating one less pastry a day for five days a week produces the same change in the outcome (i.e., moves the pointer 54*b* about the same distance toward the recommended levels). For some users, cutting down on eating is easier to do than adding more physical activity while the opposite may be true for other users. Some users will choose a blended approach. For example, a user might add an additional 10 minutes of physical activity each day and choose pastries on a less frequent basis.

In another example, a user might be presented with the options of quitting smoking, exercising 30 minutes per day, and eating five servings of fruits and vegetables per day, and limiting her saturated fat consumption to the recommended level everyday in evaluating the effect of metabolic syndrome or risk of a certain type of cancer. The user again can use the Outcome Simulation Tool 24 to choose one of the options or come up with a blended option that is realistically achievable. With the instant feedback function, each user can choose the set of changes she can make to achieve the overall goal. The "You Were Here" pointer 54*a* remains in its constant position to visually show the user where she started, and the "You Could Be Here" pointer 54*b* shows the user how far she has come (or could go), providing encouragement.

The thermometer 50 may be configured to be continuous or categorical (e.g., low, medium, high). For example, there may be four color-coded categories in the thermometer for Physical Activity Outcome: "very inactive," "needs improvement," good for health," and "for weight control." The category "for weight control" can indicate that the amount of physical activity reported is sufficient to prevent long-term weight gain or to initiate weight loss. In another example, the categories for energy balance may indicate the number of pounds of weight that could be lost per week, by instituting changes to diet and activity behaviors. And in another example, the four color-coded categories in the thermometer for a certain health risk (e.g., heart disease, Diabetes) may be "high risk," "elevated risk," "moderate risk," and "low risk."

In addition to the thermometers, there is a narrative feedback 56 provided to the user. There may be a unique narrative feedback 56 presented for each Topic 58. The narrative feedback 56 includes quantitative information (e.g., "you are getting 150 minutes of moderate aerobic activity per week") as well as qualitative information (e.g., "you are eating far too much sugar"). Within each Topic, different narrative feedback 56 is given for different levels of result. The evaluation codes for the Outcome Simulation Tool are written in JavaScript so that they can execute in the user's browser. This way, there is no need for the user's computer to make a call to the system server each time the user changes an answer.

Figure 3:
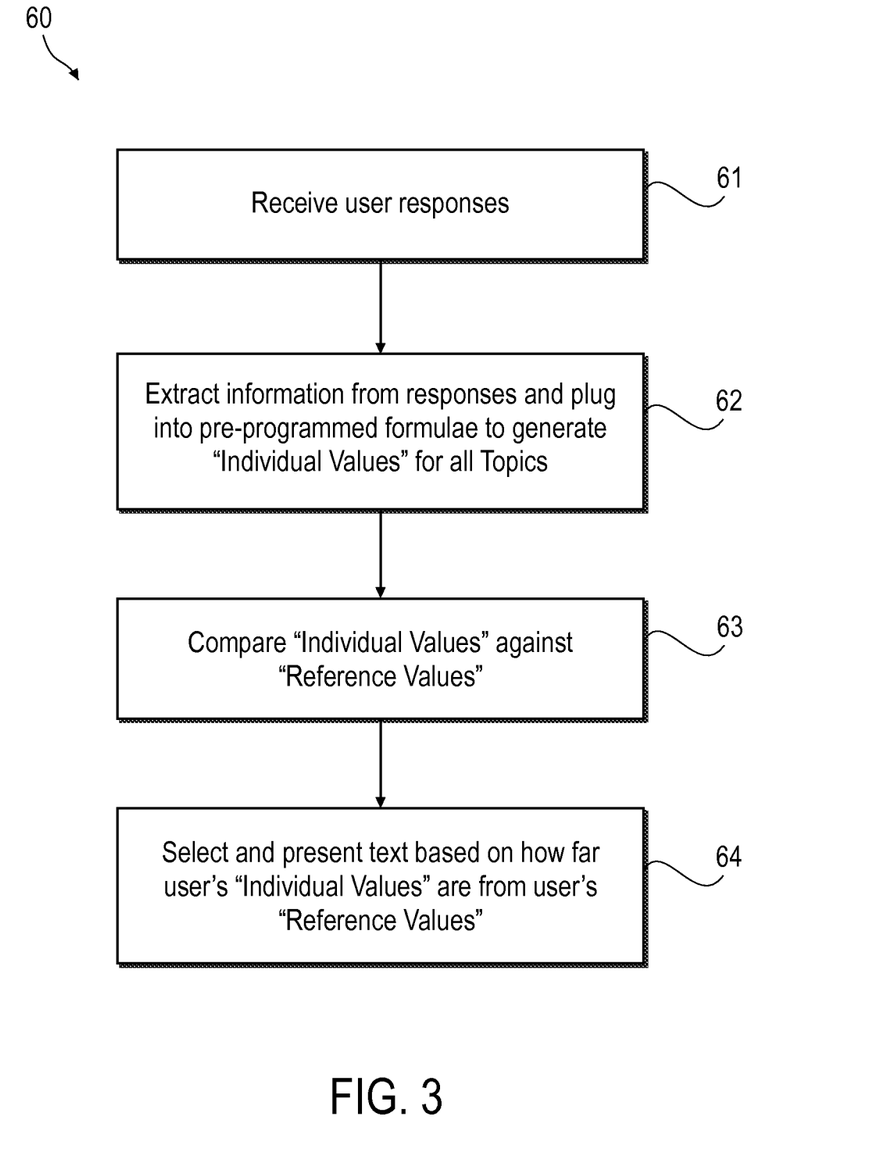
FIG. 3 depicts a text selection process that is used to select the text to be presented in the narrative feedback portion of the base Action Plan generation page.

FIG. 3 illustrates a text selection process 60 that is used to select the text to be presented in the narrative feedback 56. Analyses are done for specific Topics. For example, analysis may produce evaluations related to the person's intake of harmful fats such as saturated fat or trans fat. Calculations involving calories, carbohydrates, fiber, fruit and vegetable servings, glycemic load, fruit and vegetable cup equivalents per day may be made. Analysis related to Physical Activity includes calculations involving types of activities, rankings based on duration, total minutes in activities per week, calculation of time in sedentary, moderate, vigorous, and leisurely activities, and whether the user meets recommended guidelines of Physical Activity for fitness, weight loss, or weight maintenance. The results of the analyses are presented in a corresponding color-coded text box 56*a* [red, green, yellow] and summarized in the narrative feedback 56.

As shown, the text selection process 60 begins when user input is received (step 61). The user input is processed, for example by being plugged into preprogrammed formulae, to generate "individual values" for each of the Topics (step 62). The user is presented with questions that pertain to a number of Topics, while the text selection process 60 is particular to a Topic, in this particular embodiment. Hence, the user inputs that pertain to the relevant Topic (e.g., Calories) are identified and the information that represents factors to be taken into account is extracted in step 62. For example, in dealing with the Calories domain, the information pertaining to frequency of consumption, portion size, food type, and nutritional content may be used in the formulae to generate the "individual value." The "individual values" are compared against "reference values," which may reflect Federal or organizational guidelines for recommended levels of dietary intake and physical activity for personal factors such as age, sex, pregnancy status, body mass index, weight, etc. (step 63). The text reflects how close or far the user's individual values are from her recommended caloric intake level ("reference value") (step 64).

The system allows the user to combine Topics in personalizing a base Action Plan. For example, the user could identify changes to foods for reducing caloric intake, and changes to physical activities to increase energy expenditure. By combining changes to these Topics, the user could see the resulting total calorie deficit in the outcome display. Often, combinations of changes involve several Topics. For example, a change in risk of premature heart disease (an Outcome) could involve changes in smoking, dietary intake, physical activity, and blood pressure control.

After identifying the set of changes in behaviors or conditions that would achieve the desired Outcome, the system displays the base Action Plan showing the specific changes to be achieved in each of the Topics 58 chosen by the user (step 18/19 in FIG. 1). As shown in FIG. 2, the Action Plan generation page allows the user to select from different types of system-generated Action Plans 51, personalize the system generated Action plans by using the Outcome Simulation Tool 24, to print 55 and save 57 the system-generated and user-personalized Action Plans, or to create her own User-Generated Action Plans 53. The Action Plan page permits the user to choose among multiple different suggested changes, perhaps to identify the one that would have the greatest impact or would that would be easiest for the user to achieve. The Action Plan that is generated may be stored in a user Home Page to be accessible by the user, as will be described in detail below.

After the base Action Plan generation is completed, it is delivered to the user via interactive emails, and/or via a web-based application, or via text messaging, or smartphone application, or other application. The user interacts with the appropriate interface and personalizes the goals (step 20 in FIG. 1), setting her goals for the week. During the Personalization process, the user may modify one or more of the base Action Plans. She may also write her own goal, fill in the blank, or choose an aspect of the goal from a drop-down menu.

Figure 4:
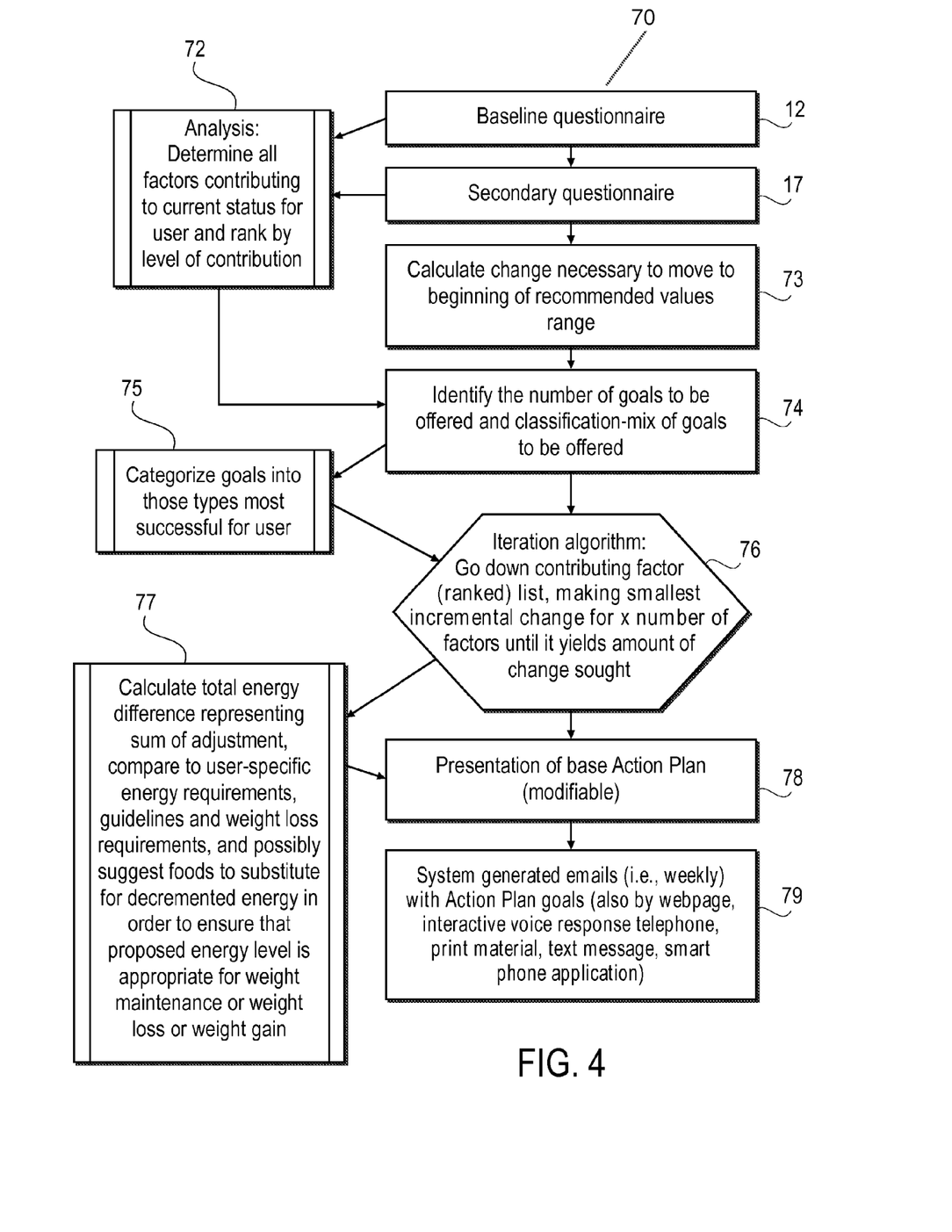
FIG. 4 depicts the Action Plan generation process whereby a base Action Plan is generated.

FIG. 4 depicts the Action Plan generation process 70 whereby the base Action Plans are generated by the system (in step 19 of the goal management process 10). The Action Plan generation process 70 breaks down the general recommendation that was presented to the user in step 16 of the goal management process 10 into a smaller, "bite-size" set of concrete goals. The Action Plan generation process 70 may generate some base Action Plans by calculating the shortest distance between the user's current behaviors/conditions and recommended levels, and presenting a small number of small-step goals. Alternative base Action Plans may be generated to include a larger number of smaller-step goals that may be preferable to some users.

As shown in FIG. 4, the Action Plan generation process 70 takes a user's input to the baseline questions 12 and the secondary questions 17 and analyzes both sets of answers 72. During the analysis, the system processes the user input value (e.g., 2 hamburgers, light jogging for 30 minutes) to produce an individual value that is usable for calculation (e.g., 20 grams of saturated fat, 180 calories burned). When all the individual values of all the food items and/or physical activities are summed, a total value is generated (e.g., total calorie consumption for the day, total number of calories burned per day). The sums of the individual values are then compared with reference values, which reflect Federal or organizational recommendations on food consumption and activity levels and generally indicate where a user wants to be. The comparison reveals which factors contribute most significantly to the user's not being in the recommended level of diet and activity. In one embodiment, the individual values reflect a user's average daily consumption of a specific food item or the user's average daily activity level, taking into account the usual frequency (how many times a week), usual portion size, duration of activities, and types of foods/activities. A total value is generated as the sum of the individual values. Then, the contribution of each item (e.g., food item, a particular activity) to the total value is determined and the items are ranked by their level of contribution to the total value.

The system calculates the change that is necessary to move the user from her current levels of diet and activity to the recommended level range (step 73). This calculation may be done on a Topic-by-Topic basis. Then, based on how much change is needed to get to the recommended level and the specific contributing factors for the current undesired state, the system determines the number and difficulty of goals for the particular user (step 74). A goal such as "I will eat x servings of fruits and vegetables this week" can be generated, wherein x is a calculated number determined by taking the difference between the user's current fruit/vegetable intake and their recommended intake level. User's answers to the tailoring questions may also be used to identify whether goals are appropriate for a user. For example, if a user indicated that she does not cook, cooking-related goals would not be presented to her.

With the long-term goal defined and the items ranked, an iterative process begins whereby a weekly (or other incremental) goal is set. Generally, using a set number of items from the user input, the system takes the highest-ranked item, makes the smallest incremental change to the input value that is associated with it (e.g., frequency or quantity), and checks how that incremental change affects the total value (step 76). If the total value is still not at the recommended level (i.e., the reference value), the system moves to the next-highest-ranked item, makes another incremental change to the item's input value, and recalculates the total value and the difference again. The total value, at this point, would be calculated using the cumulative value of all the changes made thus far—i.e., based on the changed value of the highest-ranked item and the next-highest-ranked item. The process repeats through the list of items a number of times until a condition is fulfilled—e.g., the total value is close enough to the reference value, which reflects the recommended level. Ideally, the total value would be substantially equal to the reference value. However, since some food intake or physical activity level may only be changed by a set increment, the condition would be fulfilled if the difference between the total value and the reference value is converged to within a predetermined amount (e.g., 25 calories). The process below describes one iterative method of step 76:

1.—Calculate the Difference between User Total and recommended level.
2.—Determine number of goals-to-be-generated. This could be 1 or more, and could be equal to some number like the number of weeks of the program or could be equal to the number of items in total, or something else.
3.—Generate list of top sources, ranking from most important item at the top to least important item at bottom.
4.—Beginning with the most important item, calculate the item-change-value of changing a user answer *by the smallest* increment for that item (e.g., seven days/week to six days/week, or three cupcakes to two cupcakes, or whole milk to 2% milk).
5.—Move down the ranked list summing the item-change-values until one of the following—
 (a) You reach the predetermined number of goals-to-be-generated before reaching the Difference OR
 (b) You reach the Difference before reaching the Predetermined number of goals-to-be-generated.
6.—If 5.a=True then do
 (a) Move to item at the top of the list and calculate the item-change-value of changing a user answer *by the next-in-series* increment for that item (e.g. six days a week to five days/week, or two cupcakes to one cupcake, or 2% milk to 1% milk)
 (b) Add that item-change-value to your sum of item-change-values, and compare Total to Difference (c) Move down the list summing the new item-change-values, and repeat 6.a as necessary until you reach the Difference.

7.—If 5.b=True then do
Stop

8.—List the changed-user-answers at the time that the User Total=recommended level.

9.—Insert the energy-replacement goals, as needed.

10.—Deliver the changed-user-answers to the user, as Goals, via email, text, phone, web . . . .

The iterative process may be done for a specific Topic. For example, if a user has poor outcome in the Topics of Saturated Fat and Physical Activity, the system may determine which of the two Topics to work on first and focus on one before addressing the other. On the other hand, if the user indicates that she wishes to take a blended approach where she works on the two Topic areas together, the incrementing can be done for multiple Topics or in an alternating manner between the two Topics.

For example, suppose that a particular user suffers from high Saturated Fat consumption and low Physical Activity. Based on the analysis of her answers in steps 12 and 17, the system determines (in step 72) that this user's biggest contributing factor to poor Saturated Fat level is her daily hamburger consumption, and her biggest contributing factor to low level of Physical Activity is that she watches too much television. Reduction of saturated fat consumption by x grams per week and 30 minutes of daily walking would be possible goals for this user (determined in step 74). The system would then make a small change (e.g., eating 1 fewer hamburgers this week, substituting red meat with chicken, going for a 10-minute walk after lunch) and see how the Outcome is affected. Incremental changes will continue to be made to the set of factors (as described above), the total value recalculated with each change, and the effect on the outcome (the difference between the total value and the reference value) recorded. At the end of the iterative process 75, there is a specific set of concrete goals—i.e., the Action Plan (step 78).

Goals are stored in a database and indexed by goal type. A user's past records are also stored in a database. The system then looks at the user's history (past successes and failures with the program) and classifies the goals into types that have been most successful for the particular user (step 75). For example, if the user has a higher rate of success with substitution than with strict portion control, incrementation in the direction of substitution can be chosen over portion control in step 76. If a user has shown a high rate of success with self-written goals, this user may be encourage to continue writing her own goals. If the user is brand new and has no past history with the program, incrementation will be made according to user preferences indicated, for example in the goal type field 51 of the Action Plan generation page (see FIG. 2).

The Action Plan generation process 70 allows goals to be conditionalized to be tailored to the individual end users. For example, a goal to get 150 minutes of moderate physical activity per week will not be offered to a user who is already getting that amount of activity. Additionally, goals are conditionalized on previous goal choices or successes. For example, if a user has previously chosen a goal of "I will ride my bike to work one day this week," a later goal might suggest riding to work 3 days this week. Goals may be auto-incrementing, such that if a goal is chosen, the next time the goal is to be offered, the amount/duration will have incremented to the next level for that goal.

After the convergence occurs in the iterative process of step 76, the system checks the proposed energy level that resulted from the iteration for feasibility and balance (step 77). This step ensures that no inappropriate goal will be presented to the user, such as skipping a meal three times a week (where a user's goal is to lose weight). If such situation is caught, the system evaluates user-specific energy requirements, guidelines and weight loss requirements, and suggests substitute foods that are appropriate for weight maintenance/loss so meal-skipping would not be part of the base Action Plan.

In one embodiment, the Action Plans may be generated weekly and delivered to the user in the form of e-mails (step 79), phone calls, text messages, or via smartphone application for Personalized Goal Setting (see step 20 in FIG. 1).

FIG. 5 depicts an example of embodiment of the Personalized Goal setting page that is system-generated by the Action Plan generation process 70 of FIG. 4 and personalized using the page of FIG. 2. The base Action Plan goal communication process (process 22 of FIG. 1) allows customization of the goals to produce a customized Action Plan. As shown in FIG. 5, the Action Plan goals page prompts the user to customize her goals by choosing one or more of the personalized Action Plan goals in section 82. The user may be invited to choose a specific number of goals to work on for the week (see sections 82 and 84). In section 84, there is a customizable section where a stored goal (fixed text) is combined with customizable details. In the particular embodiment, the customizable details are presented in the form of drop-down menus and fill-in-the-blanks. The user is also presented with the choice of writing her own goal de novo, or of constructing her own goal. Although not shown, there may also be a section that elicits user feedback on whether she was successful in meeting last week's goals. The received input will be used to determine, for example, what types of goals this particular user is good at meeting.

The customizable section 84 is highly tailored to a particular user. The base goal (the fixed text), for example, is selected for a user, so that different users may receive a different set of goals. Furthermore, for the drop-down menu, the options are tailored for each user such that even two users that receive the same base Action Plan may be presented with different sets of options in the drop-down menu. The following are examples of the program for the customizable section 84 with drop-down menus:

1. This week I will eat ${round(fvRecommended-fvCupEquivalents,1)} more cups of fruits and vegetables on at least [sum(currentFVdays+(1,2,3))] days this week.

2. This week I substitute [topSatFatSource1, topSatFatSource2, topSatFatSource3] for something healthier this week.

In Example 1, the first drop-down menu will show options that depend on the particular user's current level of Fruit & Vegetable consumption and their personal recommnedations, and the second drop-down menu will show options that depend on her frequency of Fruit & Vegetable consumption. In Example 2, the drop-down menu will list the user's top three sources of Saturated Fat for the particular user.

There is also an open-ended goal section 88 where the user can write her own goal from scratch. After completing the goals for the week, the user submits the goals to the system by selecting the Submit button 89, triggering the system to update and save the personalized goal in a database.

As shown in FIG. 1, the Outcome Simulation Tool 24 may be accessed by the user to view the base Action Plan, to personalize/modify the base Action Plan, and to create a user-generated Action Plan. The goal Customization page (shown in FIG. 5) may include a "Try Me" feature, which is a link that takes the user to the Outcome Simulation Tool 24 showing the question(s) relevant to the suggested goal. For example, if the suggested goal were "I will eat a serving of salad five days this week," the Try Me link would open to the Outcome Simulation Tool 24, showing the user's previous answer to frequency and quantity of salad and allowing the user to change the frequency or portion and see the effect on the Outcome. Whether or not the Try Me link is displayed can be conditionalized based on a user's answers to the baseline questions. For example, it can be conditionalized such that a Try Me link to a goal of eating less red meat would not be offered to a user for whom the saturated fat link is already low and therefore the Try Me link would not demonstrate a notable benefit from choosing that goal.

Figure 6:
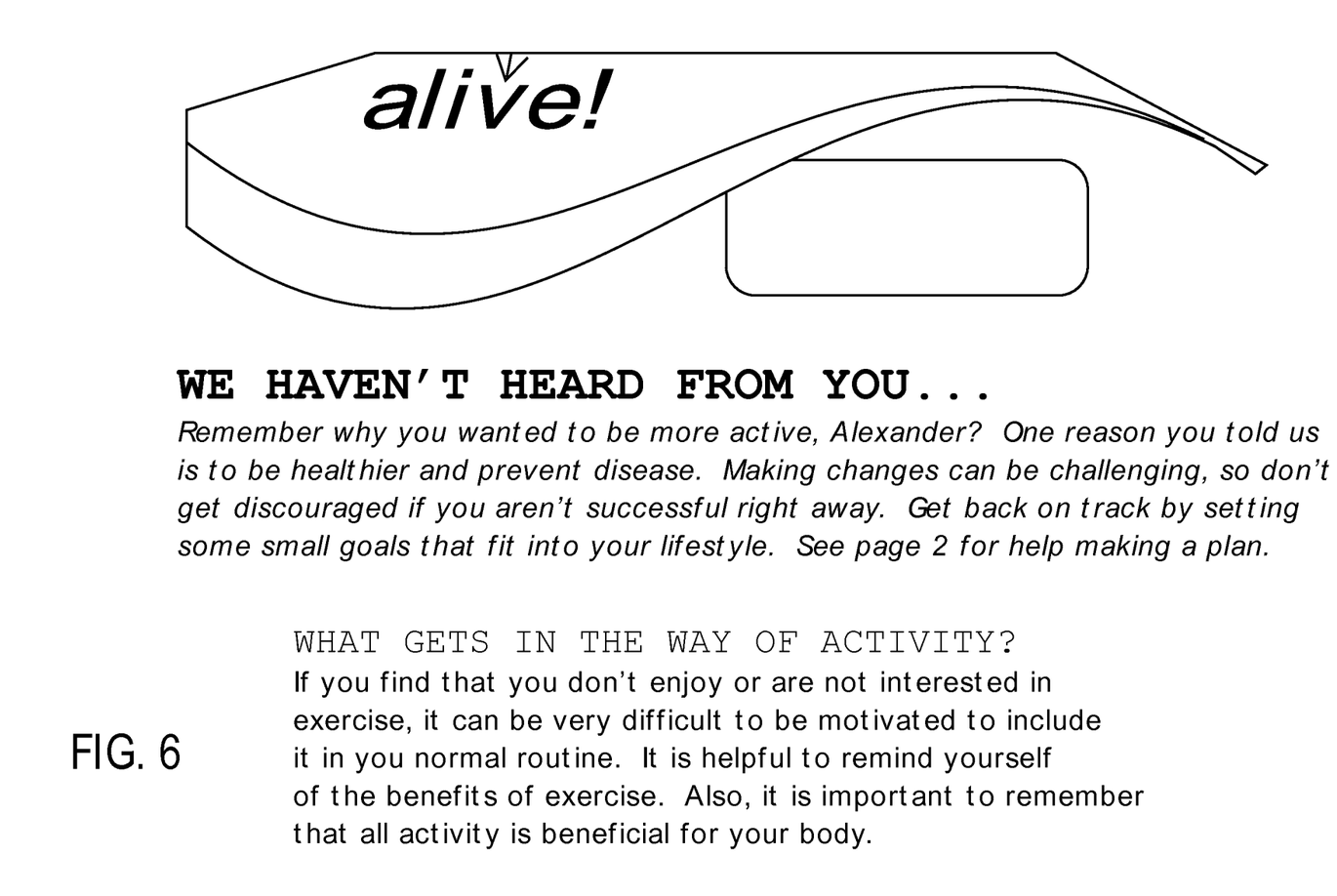
FIG. 6 depicts an example Printed Material (newsletter) that may be sent to a user as part of the goal management process.

When the user is done generating her personalized Action Plans, periodic emails, text messages, automated phone calls, a smartphone application, and/or a user Home Page maintain a line of communication between the goal management system and the user, and allow the user to further customize her goals. Support emails provide informational and/or motivational content, such as a synopsis of the week's Health Notes, a reminder of the reasons she wanted to undertake to achieve the particular outcome, methods to overcome barriers to progress, etc. Emails may also include a reminder about the goals chosen, a link to the government sites for tracking behaviors, and/or a link to the user's home page. FIG. 6 provides an example of a Printed Material (newsletter) that may be sent to a user.

In addition to setting the weekly personal goals, the system provides support to the user to achieve those goals. The Interactive Communication process (step 22 of FIG. 1) includes a user (web-based or other related application) Home Page, Automated Telephone/Voice Coaching, and/or Automated Printed Material Coaching. The Interactive Communication process utilizes the structure of a system server 90 (shown in FIG. 7) to schedule automatically generated messages and reminders for all the clients, thereby providing support and coaching that is integrated with the user's stage and progress in the system.

The goal management process 70 utilizes a system structure that permits management and configuration of all aspects of the Goal Achievement process 22. The system structure allows for the creation of Groups. Groups could be clients or target populations with a shared sets of configurations. Within each Group, there is the ability to specify a host of parameters specific to the group, including but not limited to start and end dates, whether the group contains a randomized trial subcomponent, Topics or Outcomes addressed in the Group, baseline questions used for the Group, characteristics representative of different user-types within the group, etc. For each Group, the number and frequency of emails, or other contact, can be specified, as well as the configuration of the user home page, such as the tabs, the content (health notes, quizzes), and layout. Users with heart problems, for example, may be assigned to a certain Group, or may not be offered certain types of goals.

In one embodiment, for administrative convenience, the clients may also be grouped by Paths, which can be further subdivided into Branches. The Group-Path-Branch-Step structure simplifies the housekeeping and management of client data.

As previously mentioned, the system includes a set of goals that are stored in a database, separately from the system-generated base Action Plan, which are tailored for each user. These stored goals may be accessed and presented to the user as "Other goals you might like" in the customizable goal setting section 84 of FIG. 5. If the user chooses the goal, it becomes incorporated into the personalized Action Plan. Goals may be added, deleted, or modified through the system server 90 (see FIG. 7). Parameters describing and governing the display of goals in an email are specified in the goals spreadsheet, and uploaded to the server 90. Goals may be specified for different Groups. The nature of the goal (e.g., is it a frequency type, behavioral, etc.) and the Path and/or branch and/or step associated with the goal may be specified. The specific week of the intervention in which the goal may be presented may be specified. The nature of the goal may be specified, for example: whether it should include a drop-down menu displaying series of values or lists, or a fill-in-the-blank; or whether it is available to a user based on their reported food or nutrient consumption; or whether it should include the result of a mathematical calculation, like the difference between current and recommended intake.

The system creates a unique Home Page for each user. The user Home Page may be reached by the user choosing a goal from their regular emails or by directly logging in. In one embodiment, a Home Page may have the following tabs:

1) a Current Goal tab displaying the goals recently chosen by the user, with possibility to edit the goals, and to review Tips associated with each Chosen goal, and to post chosen goals to social network sites such as Facebook and Twitter;

2) a Health Note tab displaying the week's Health Notes and a link to the previously delivered Health Notes. There is a separate Health Note for each Step of each Branch of each Path. There is a default order of presentation of Health Notes programmed into the system, but the default order can be overridden at the Group, Path, Branch, or Step level and also based on individual user answers to questions regarding level of interest in the Health Note subject matter. Health Notes are delivered to the user in the order indicated by the user as important to her;

3) a Community section that reports on Group-wide data, such as the total number of goals chosen by the Group and a link to a Facebook page specific for the program and the Group;

4) a Question of the Week section that presents a different quiz each week with content relevant to the Path of the user. Choosing an answer results in an instant response about the correct answer. This section has the ability to collect individualized information within the quiz. For example, periodically, it asks the users to report on a particular behavior of their own, such as minutes of moderate activity in the prior week;

5) a section reporting the user's Progress So Far, which summarizes the number of goals chosen by that user, the percent reported as achieved, and a categorization of the types of goals in which the user has been successful. This tab may have the following sub-tabs:

a) goals chosen by the user, percent accomplished, and a categorization of the types of goals accomplished;

b) daily tracking providing a format for daily online recording of weight, fruit servings and vegetable servings consumed, duration of specific physical activities, other behaviors relevant to the Domain, and user-defined behaviors;

c) downloadable forms for tracking physical activity, fruits and vegetables and fats and sugar consumptions, as well as downloadable trackers of weight change in spreadsheet format; and
d) questionnaire results that provide Outcomes from most recent analyses of the answers to questions, as well as previous results;
6) a link to the Resource Center, which may have the following sub-tabs:
   a) Overcoming Barriers that provides tips for overcoming challenges the user might face, indicated as a problem for her in the relevant Path,
   b) Health Notes Library that provides all of the Health Notes provided to the user thus far,
   c) Useful Links that provides links to relevant organizations, articles, and other information, and
   d) More Assessments sub-tab that provides links to national assessment tools such as the MyPyramid Tracker, as well as other calculators (e.g., risk calculators); and
7) a link to the Action Plan generation page and interactive Outcome Simulation Tool (FIG. 2); and
8) Account Settings, which may have the following sub-tabs:
   a) Switch Topic provides a way for the user to change the main focus of their program, for example from working on saturated fat intake to working on physical activities. The system remembers how far the user progressed in the original Topic, how many weeks the user has been in it, what goals have been chosen in each topic, etc. and thus tracks a user's progression through each topic. With this information, if the user later decides to switch back to the original topic, she will not duplicate anything she has done and can pick up where she had left off,
   b) Change Contact Information,
   c) Opt out of receiving the program or subcomponents of the program such as the phone or print coaching,
   d) Change Password,
   e) Invite Friends/Family and include a personal message in an invitation, and
   f) Contact Us.

In addition to the Home Page, the system includes individualized telephone coaching. It uses variables in the system specific to the user to provide automated telephone coaching. The telephone coaching module has the following components:
1) Pre-recorded multi-component scripts with coaching tailored to different conditions of the user, including Path, week of the program, whether the user is a drop-out risk, what Motivations were specified by the user in her answers to the questionnaire(s), what barriers or challenges were specified by the user. A user may be considered a drop-out risk if she has not interacted with the program and chosen a goal for a certain interval of time;
2) Behind-the-scenes programming to extract and pass information relevant to the Interactive Voice Response (IVR) telephone system, make calls, react appropriately to different conditions such as no-response or answering-machine, deliver segments of script appropriate for the users status and variables, and receive and record responses; and
3) Behind-the-scenes programming to schedule calls during call times specified by user in a previous questionnaire, and re-calling as appropriate.

In some embodiments, the interactive Voice Response health coaching system may include recorded messages in the voice of well known people, such as celebrities or politicians. The user would be able to express her preference of whose voice she would like her messages to be in.

Furthermore, the system offers individualized Printed material-based coaching as a supplement or an alternative to the telephone coaching. The Printed material coaching module has the following components:
1) Pre-developed print segments tailored to different conditions of the user, including Path, week of the program, whether the user is a drop-out risk, what motivations were previously specified by the user, what barriers were specified by the user, and other factors derived from the user's answers to the questions;
2) Behind-the-scenes programming to extract and pass information relevant to the print system, collate user-appropriate segments into a coherent newsletter, generate a coherent tailored newsletter, create multi-user pdf;
3) Behind-the-scenes programming to transmit newsletter pdf to fulfillment agent according to schedule.

Figure 7:
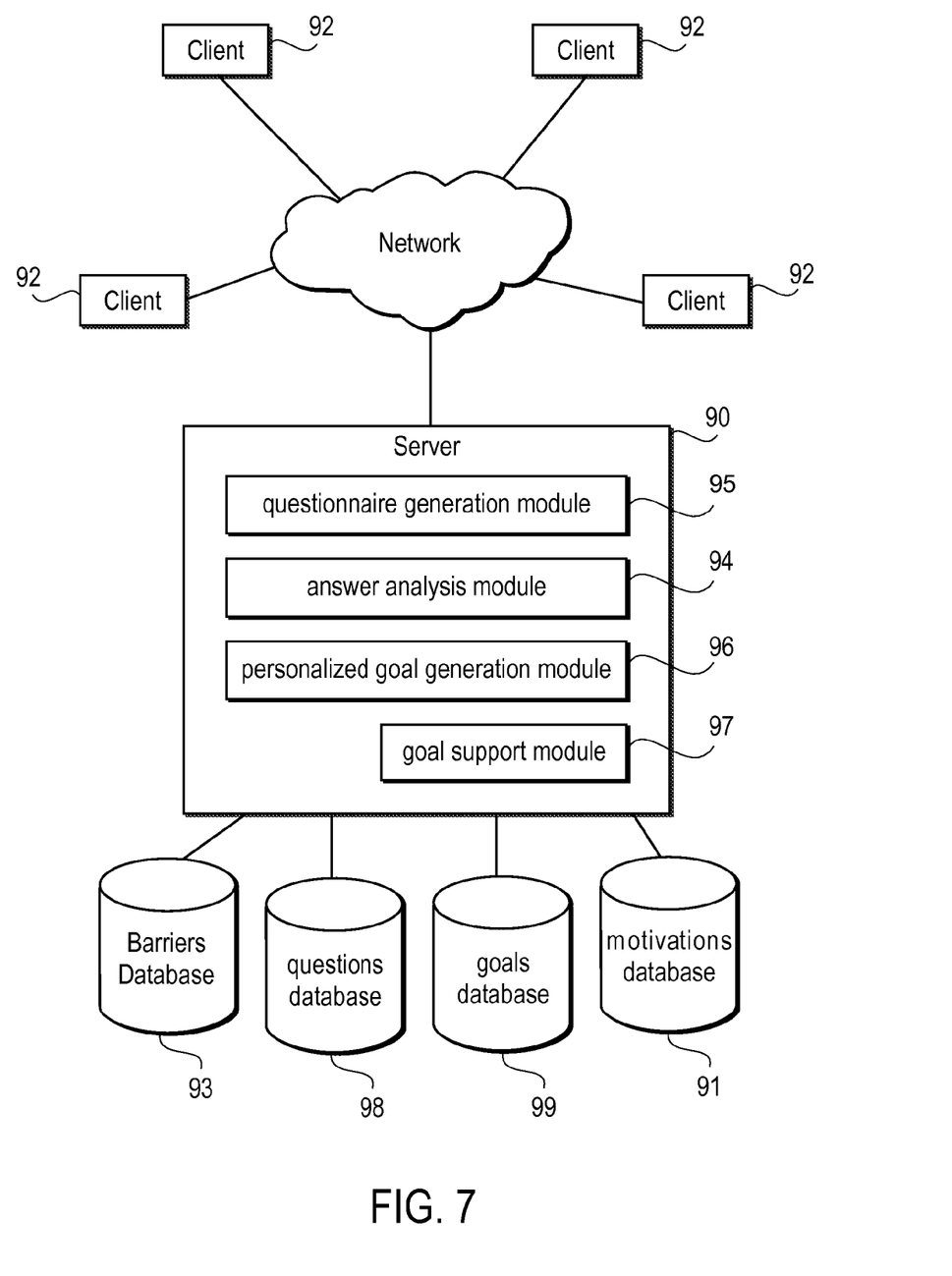
FIG. 7 depicts a client-server architecture that may be used to implement the system of the invention.

FIG. 7 depicts a client-server architecture that may be used to implement the system of the invention. In this architecture, the system server 90 communicates with a plurality of clients 92 via a network. Most of the goal management process 10 is executed by the server 90, which includes a questionnaire generation module 95, answer analysis module 94, personalized goal generation module 96, and a goal support module 97. The questionnaire generation module 95 pulls questions from a questions database 98, which stores all the questions that could be presented to the user at various stages of the goal management process 10. The questions may be stored in a spreadsheet format. Similarly, the customized goal generation module 96 retrieves goals from a goals database 99, which stores all the non-Action-Plan goals in the system (e.g., the fixed text portion of the goals in the customizable section 84 shown in FIG. 5).

The system also includes a Motivations database 91 and a Barriers database 93. The Barriers database includes descriptions of common barriers that can impede change in different Topic areas (for example, "I don't have enough time to cook"), and includes tips to help users overcome those barriers. The system identifies a user's barriers, and delivers the Barriers database tips throughout the system, for example in the weekly emails and through the phone coaching system. The system also includes a motivations database 91 that includes descriptions of reasons that users are motivated to change behavior (for example, "I want to be a good role model for my kids"). The system identifies a user's Motivation factors and reminds them of their motivations throughout the system, for example in the weekly emails and through the phone coaching system. The databases 91, 93, 98, 99 may be local or remote, and there may also be one or more other databases that store users' answers to questions, user's personal information, etc. and provide a subset of this information to the client 92 as needed. The client 92 may utilize local or remote storage (not shown) for caching selection information received from the server 90 or input by the user. The goal support module 97 manages the scheduling and delivery of periodic emails, reminders, voice messages, printed material, etc.

The communication between the client 92 and the server 90 can be based on a public protocol such as Hypertext Transfer Protocol Secure (HTTPS) or a proprietary protocol. The server 90 can incorporate the Outcome Simulation Tool. In some embodiments, the Outcome Simulation Tool partly or wholly resides on the client 92 to ensure fast, instant responses to the user. In this situation, the server 90 would not be in one physical location but would be partly at the client site. Generally, the Outcome Simulation Tool incorporates the user responses, a set of algorithms, and a set of numerical values to determine a range of feedback and behaviors. The numerical values can include user total and food-specific levels of energy, fruits and vegetables, minutes of physical activity at different levels with which a simulation is performed, and other values related to the outcomes being assessed. Based on the simulation, the pointer 54*b* is moved as described above.

In some embodiments, the server 90 may be a server farm including a cluster or collection of networked servers capable of accommodating high computational load of many clients. This multi-server architecture requires that the server 90 maintain the data on a per client basis. A proxy (not shown) at the interface between the server 90 and the network determines which server is the least busy, and assigns a job to that server. From that point on, the client can communicate directly with the selected server or the proxy can treat each subsequent request from the client as it did the first request. Server farms also allow for dynamic load balancing. For example, if the performance of a particular server deteriorates due to load, the deteriorating server or the proxy can move any jobs currently pending on the deteriorating server to a less burdened server. This can occur without the client's knowledge. In some implementations, multiple servers in the farm can cooperate to accomplish a single job by partitioning computing tasks among them.

The client 92 includes functionality expressed as software components which may be combined or divided to accommodate different implementations. A graphical user interface (GUI) can present images to users, prompt users for input, and provide users with visual and audio feedback based on their input. In various implementations, the GUI is implemented as an Adobe Flash presentation (the Adobe Flash Player is available from Adobe Systems Incorporated of San Jose, Calif.); however, other implementations are possible. An input model component interprets user input from one or more input devices as signals. For example, computer mouse input or a touch on a touch screen could be interpreted as a selection of a certain answer to a question. Input devices may include personal computers, tablet computers, mobile devices such as smart phones, etc.

It should be understood that the invention can be practiced with modification and alteration within the spirit and scope of the disclosure. The description is not intended to be exhaustive or to limit the invention to the precise form disclosed.

What is claimed is:

1. A computer-implemented method of generating a set of health-related goals, the method comprising:
   receiving a first user input for a user account, the first user input including items and an input value associated with each of the items;
   assigning individual values to the items based on the input value;
   summing the individual values to generate a first total value;
   ranking the items according to the contributions of their respective individual values to the first total value;
   determining a difference between the first total value and a corresponding reference value;
   identifying the item that is highest-ranked, changing the input value associated with the item, and recalculating the total value and the difference using the changed input value;
   if a condition is not fulfilled, identifying the item that is next-highest-ranked, changing the input value associated with the item, and recalculating the first total value and the difference using the changed input value and repeating the recalculating with a next-highest-ranked item until the condition is fulfilled;
   generating a base plan for achieving a goal based on the changed input value of the items at the time the condition is fulfilled;
   providing an output simulation tool including images of a first thermometer and a second thermometer viewable together, the first thermometer being marked with one of frequency and portion for a selected topic and having a first pointer, and the second thermometer showing proximity to goal achievement and having a second pointer and a third pointer, wherein the second pointer indicates beginning state reflective of the first total value and remains in the same position;
   receiving a second user input reflecting a hypothetical change by moving the first pointer along the first thermometer;
   determining a second total value based on the second user input;
   immediately placing the third pointer on the second thermometer at a position reflective of the second total value, thereby providing immediate visual feedback as to the effect of the second user input indicated by change in distance between the second pointer and the third pointer; and
   generating a modified base plan based on the second pointer's reaction to the second user input.

2. The computer-implemented method of claim 1, wherein the condition is fulfilled if the difference between the first total value and the corresponding reference value is less than or equal to a predetermined amount.

3. The computer-implemented method of claim 2 further comprising repeating the identifying, the incrementing, and the recalculating of the highest-ranked item if, after the value associated with the lowest-ranked item has been changed, the difference between the first total value and the corresponding reference value is greater than the predetermined amount.

4. The computer-implemented method of claim 1 further comprising:
   setting different goal types; and
   selecting a preset number of goals to be offered as the specific goal for each goal type.

5. The computer-implemented method of claim 4, wherein the different goal types comprise frequency, portion, amount, type, substitution, duration, intensity, environmental changes, and any combination thereof.

6. The computer-implemented method of claim 1, wherein the goal is an energy-replacement goal, further comprising selecting a substitute item based on nutritional and energy needs of the user, the individual values associated with the substitute item, the item whose individual value is changed, and the reference value that corresponds to the item.

7. The computer-implemented method of claim 1, wherein the user input values pertain to the user's diet, physical activity level, spending habits, and lifestyle.

8. The computer-implemented method of claim 1 further comprising:
   accessing the history of success and failures with each type of goal for the user account; and
   selecting the goals with a high rate of success.

9. The computer-implemented method of claim 1 further comprising:
   generating a plurality of options relating to the goal; and
   receiving further user input comprising a selection from the plurality of options.

10. The computer-implemented method of claim 1, wherein the outcome simulation tool immediately adjusts a position of the second pointer in response to receiving the second user input and determining the second total value.

11. The computer-implemented method of claim 1, wherein the reference value depends on the user's age, gender, and pregnancy status.

12. The computer-implemented method of claim 1 further comprising generating an audio health coaching message pertaining to the goal.

13. The computer-implemented method of claim 12, wherein the audio health coaching message comprises a pre-recorded voice in an Interactive Voice Response system.

14. The computer-implemented method of claim 1, further comprising presenting a set of options in the form of a drop-down-menu or a fill-in-the-blank, wherein selected options are used to generate a personalized goal pertaining to food consumption and activity level.

15. The computer-implemented method of claim 14 further comprising tailoring the set of options to account for user's age, gender, and conditions that limit physical activity.

16. The computer-implemented method of claim 14 further comprising generating the set of options based on a difference between the individual value and a reference value that is associated for each of the items.

* * * * *